Feb. 13, 1951     R. L. BUCHANAN     2,541,495
PROCESS OF PREPARING TITANIUM DIOXIDE
Filed Feb. 19, 1948
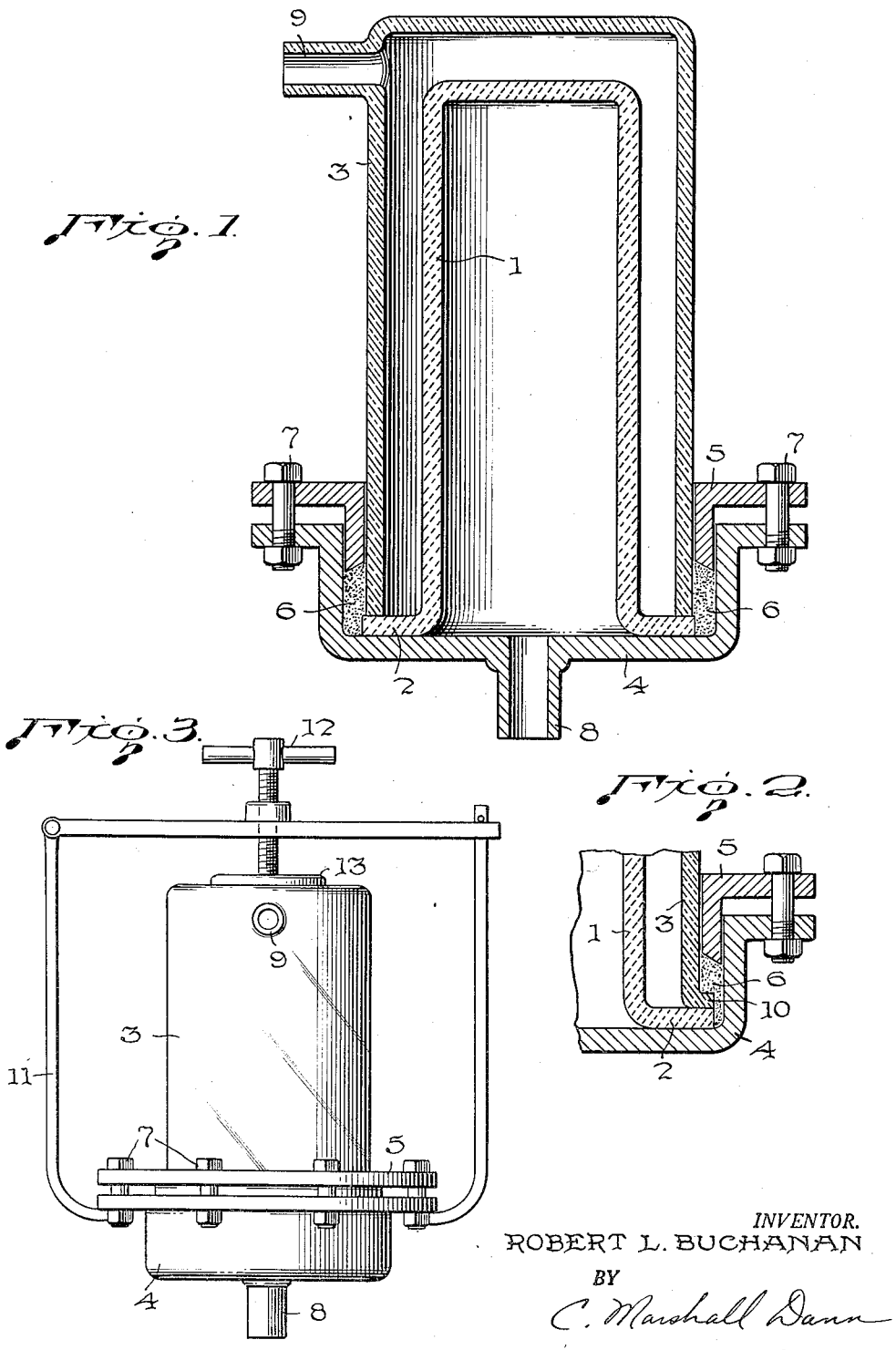
INVENTOR.
ROBERT L. BUCHANAN
BY
C. Marshall Dann
AGENT Patented Feb. 13, 1951

2,541,495

UNITED STATES PATENT OFFICE 2,541,495

PROCESS OF PREPARING TITANIUM DIOXIDE

Robert L. Buchanan, Cranford, N. J., assignor to E. I. du Pont de Nemours & Company, Wilmington, Del., a corporation of Delaware Application February 19, 1948, Serial No. 9,367

6 Claims. (Cl. 23—202)

This invention relates to the vapor phase oxidation of titanium tetrachloride to produce titanium dioxide pigments, and particularly to a method for obtaining preheated oxygen-containing gas suitable for use in such a process.

In processes for the production of titanium pigments by the vapor phase oxidation of the tetrachloride, it is necessary to preheat the reactants to high temperatures before mixing and reacting them. In most processes wherein gases must be heated to high temperatures, metal heat exchangers are employed, because of their superior efficiency and low cost as compared with other known types of heat exchangers. An exception to this general practice occurs when corrosive gases are to be heated. Titanium tetrachloride, for example, attacks most metals rapidly and must be heated in apparatus constructed of some more inert material such as silica. Air and other oxygen-containing mixtures are less corrosive and may be heated in metal equipment made of high temperature alloy without effecting rapid deterioration of the metal. However, at the temperatures which must be used, it is found that even though the metal is attacked very slowly, there is some reaction between the metal and the oxygen-containing gas, with the result that the gas becomes contaminated with various metal compounds which find their way into the resulting titanium dioxide. It is well known that even small amounts of certain metals in titanium dioxide cause discoloration, even to the point where the oxide becomes worthless as a white pigment. This is particularly true of nickel and chromium, two of the major constituents of high temperature alloys. Iron, vanadium, cobalt, manganese, molybdenum, tungsten and tantalum also form colored compounds which adversely affect the color of white pigments. For this reason, the preheating of the oxygen-containing gas in metal equipment has heretofore been precluded, despite the extremely small amount of reaction occurring between the gas and the metal and despite the substantial advantages offered by the use of metal preheaters.

It is an object of this invention to provide a method for use in the vapor phase oxidation of titanium tetrachloride, which permits the use of metal heat-exchangers for preheating the oxidizing gases. It is a further object to permit the preparation of high quality titanium dioxide pigment of satisfactory color by a vapor phase oxidation process in which the oxygen-containing gas is preheated in metal equipment. It is a still further object to provide a method for removing metallic impurities from oxygen-containing gas which has been preheated in metal equipment. Further objects will appear from the description of this invention which follows.

Contrary to expectation, I have found that the undesirable metal compounds which become admixed with the oxidizing gases on passage through a metal heat exchanger are in the form of finely divided solid particles, suspended in a gas stream, and not actually dissolved in it; and furthermore, that these metal compounds can be removed by passing the gases through a filter medium. My invention therefore comprises the method of improving the color of pigment titanium dioxide produced by the vapor phase reaction between titanium tetrachloride and an oxygen-containing gas which has been passed through a metal preheater which comprises passing the preheated oxygen-containing gas through a refractory filter medium prior to its contact with the titanium tetrachloride.

In the practice of this invention, the porous refractory filter is preferably constructed of alumina, but may be of silica, boron carbide, clay and the like. A wide variety of suitable refractory filters is available, and the choice of shape, material, size, and pore size will depend on the intended gas temperature, the desired purity of the product, and other similar factors. In most cases, a filter having an average pore diameter of 0.3 mm. will remove a large proportion of the contaminating particles from the gas stream, although I prefer to use a filter having an average pore diameter of about 0.1 mm. Filters of this type are capable of removing suspended particles considerably smaller than the average pore diameter of the filter. It will usually be advisable to use the finest grade filter which does not require excessive pressure on the gas stream.

The accompanying drawings illustrate filter arrangements which may be used in the practice of this invention. Figure 1 shows a sectional view of one suitable arrangement, while Figure 2 is a sectional view of a portion of the apparatus showing an alternative sealing arrangement. Figure 3 is an elevation showing a method of clamping the filter assembly.

In the figures, the porous refractory filter thimble 1, having its open end flared out to give a flange 2, is enclosed by a fused silica chamber 3. The assembly is held together and made gastight by the metal cap and stuffing box 4, which contains a packing gland 5. The stuffing box is packed with finely divided silica 6. Tightening of the packing gland 5 by means of bolts 7 causes the powder to flow slightly, making a tight seal. This type of seal and a number of variations thereof are fully described in copending applications Serial Numbers 3,795 and 3,796 of Richard M. Luckring. In use, the heated oxidizing gas passes from the metal connecting tube 8 through the filter thimble 1, where entrained solids are deposited, and out the side-arm 9 of the silica chamber 3.

In order to prevent the filter assembly from becoming separated by gas pressure, it may be desirable, as shown in Figure 2, to provide a flange 10 on the open end of the silica chamber 3, which will overlie the flange 2 on the filter thimble. With this arrangement, the packing gland 4 makes it impossible for the filter assembly to become accidentally separated.

Another method of holding the assembly together is shown in Figure 3 and comprises an external metal clamp 11 engaging the flange of the metal stuffing box 4 and bearing through a hand-operated screw 12 and a plate 13 on the upper surface of the fused silica chamber 3.

Other filter arrangements may be used in place of that shown in the drawing. For example, a flat filter disc instead of a thimble may be inserted in the line. Still another useful filtering arrangement comprises a steel shell lined with refractory brick and tightly packed with mullite or silica wool fibers.

The part of the filter housing to which the purified gases are exposed, and the connection to the reaction vessel, should be constructed of some refractory, rather than a metal, to prevent further contamination. It will generally be advisable to insulate or even heat these parts, so that the preheated gases will not be cooled excessively while passing through them.

In a continuous process, it will be desirable to make provision for cleaning the filters without interrupting the flow of oxidizing gases to the reaction vessel. This may be done conveniently by providing two or more filters in parallel, arranged so that the gas flow through any one can be stopped for cleanouts while the gases are passing through another filter or group of filters. Where scale contamination is particularly severe, the frequency of cleanouts may be reduced by using an arrangement of several filters of graduated pore size, in series, so that most of the scale is removed by the coarser filters, and the pores of the finer one become plugged only after long periods of operation. An alternative method is to use a cyclone, settling chamber, or other known device for separating the larger solid particles suspended in a gas stream, in series with the filter.

The method of cleaning the filters will depend on the nature of the refractory used and or the metal employed in the preheater. In most cases, the refractory filter will be adequately cleaned by passing hot concentrated hydrochloric acid through it one or more times, followed by a water wash.

The metal preheater is preferably constructed of a high temperature alloy which may be maintained at temperatures of 800° C. or above for extended periods, in the presence of oxygen, without rapid corrosion. Stainless steels containing substantial amounts of chromium and nickel are well suited for this purpose. A list of high temperature alloys designed to resist attack by air is shown on page 2107 of Perry's "Chemical Engineers' Handbook," 2nd ed., McGraw-Hill Book Co. (1941). The preheater may be of any desired shape, and must be large enough to insure heating of the oxidizing gas to the required temperature. This temperature is dependent on the reaction conditions chosen, but will usually be at least 600° C. and more frequently will be 900° C. or higher, and may extend as high as 1200° C. The higher the temperature, the greater will be the oxidation of the preheater and the greater the need for removal of impurities from the gas stream. This invention has its greatest utility therefore in processes where the oxygen-containing gas is heated to 900° C. or above, but is also of value where the preheat temperature is as low as 600° C., and in some cases at even lower temperatures.

The general process of preparing titanium dioxide by the vapor phase oxidation of a titanium halide, and particularly of titanium tetrachloride, has been described in a number of U. S. patents, including Numbers 2,240,343 and 2,367,118. While many variations are possible in the conditions under which the oxidation takes place, it is almost always necessary to preheat the oxygen-containing gas to a relatively high temperature. The present invention is therefore of value and importance generally, without regard to the particular conditions of oxidation.

The oxidation of titanium tetrachloride may be conducted with pure oxygen, with air, or with various other mixtures of oxygen with nitrogen or other inert gas. The term "oxygen-containing gas" as used throughout the specification and appended claims is intended to include each of these possibilities.

The following examples are given merely as illustrative of this invention, and are not to be construed as in any way limiting its scope.

*Example I*

In a conventional type apparatus for the production of six pounds per hour of titanium dioxide pigment by vapor phase oxidation of titanium tetrachloride with air, an air preheater consisting of 12 ft. of coiled ¼" I. D. # 309 stainless steel tubing was used. This stainless steel contained about 24% chromium, 13% nickel and 63% iron. The hot end of this tube was welded to the stainless steel cap of a filter housing similar to the one shown in the drawing. The filter thimble was porous fused alumina, with an average pore diameter of about 0.09 mm. The outer container in which the thimble was enclosed was made of silica. The metal cap and stuffing box were exposed to the atmosphere to cool them somewhat and to prevent excessive oxidation, but the silica chamber and tube leading to the reactor were heated by a gas-fired furnace to 1000° C., to prevent loss of heat from the hot air.

The metal preheater tube was heated in a gas-fired furnace to between 970° and 1070° C., and air passed through it at a rate of 125 gram moles per hour. After 5 hours of operation, the filter was cleaned, and approximately 10 grams of scale were removed. This analyzed as follows: 11.7% chromium, 32.5% iron, and 7.6% nickel.

The pigment produced with this apparatus was of excellent quality, and indistinguishable from that produced in the same apparatus with a preheater system constructed entirely of fused silica.

The stainless steel preheater used in this example had previously been used, without any filter, in a number of runs in a similar apparatus.

The pigment produced was noticeably yellow in color.

*Example II*

Pigments produced in equipment using the three different preheater arrangements described in Example I analyzed as follows:

| Preheater | Parts per million | | |
|---|---|---|---|
| | Cr | Ni | Fe |
| Stainless Steel without filter | 13.7 | 28 | 87 |
| Stainless Steel with filter | 0.4 | 4 | 7 |
| Fused Silica | 0.3 | 3 | 5 |

My invention permits the use of conventional metal heat-exchangers to perform an operation which previously required special refractory apparatus. Metal heat exchangers are cheaper to construct, install, maintain, and operate than any known refractory heat exchanger of equivalent capacity. The accessory apparatus required for the practice of this invention is simple and required little attention, so that only a negligible additional expense is caused by its use.

As many different embodiments of this invention may be made without departing from the scope and spirit thereof, it is to be understood that I do not intend any limitation except as contained in the appended claims.

I claim:

1. In the manufacture of pigment titanium dioxide by the vapor phase oxidation of titanium tetrachloride, the steps which comprise passing an oxygen-containing gas through a stainless steel preheater until the gas has reached a temperature above 600° C., then passing the gas through a porous refractory filter to remove metal oxide impurities formed during the preheating step and entrained in the gas, and thereafter bringing the said gas into contact with the titanium tetrachloride to produce titanium dioxide.

2. In the manufacture of pigment titanium dioxide by the vapor phase oxidation of titanium tetrachloride, the steps which comprise passing air through a stainless steel preheater until the air has reached a temperature above 600° C., then passing the air through a porous refractory filter to remove metal oxide impurities formed during the preheating step and entrained in the gas, and thereafter bringing the said air into contact with the titanium tetrachloride to produce titanium dioxide.

3. The method of preparing titanium dioxide of improved color by the vapor phase oxidation of titanium tetrachloride which comprises heating an oxygen-containing gas in a metal preheater to a temperature above 600° C., passing the preheated gas through a refractory filter medium to remove metal oxide impurities formed during the preheating step and entrained in the gas, and thereafter bringing the said gas into contact with titanium tetrachloride to produce titanium dioxide.

4. The method of preparing titanium dioxide of improved color by the vapor phase oxidation of titanium tetrachloride which comprises heating an oxygen-containing gas in a metal preheater to a temperature above 600° C., passing the preheated gas through a refractory filter medium having an average pore diameter less than 0.3 millimeter to remove metal oxide impurities formed during the preheating step and entrained in the gas, and thereafter bringing said gas into contact with titanium tetrachloride to form titanium dioxide.

5. The method of preparing titanium dioxide if improved color by the vapor phase oxidation of titanium tetrachloride which comprises heating an oxygen-containing gas in a metal preheater to a temperature above 900° C., passing the preheated gas through a refractory filter medium having an average pore diameter less than 0.3 millimeter to remove metal oxide impurities formed during the preheating step and entrained in the gas, and thereafter bringing said gas into contact with titanium tetrachloride to form titanium dioxide.

6. In the manufacture of pigment titanium dioxide by the vapor phase oxidation of titanium tetrachloride, the steps which comprises passing air through a heated stainless steel tubular preheater until the air has reached a temperature of 970° C., then passing the air through a porous alumina filter having an average pore size of 0.09 millimeter to remove metal oxide impurities formed during the preheating step and entrained in the gas, and thereafter bringing the said air into contact with titanium tetrachloride to form titanium dioxide.

ROBERT L. BUCHANAN.

REFERENCES CITED

The following references are of record in the file of this patent:

UNITED STATES PATENTS

| Number | Name | Date |
|---|---|---|
| 2,068,048 | Adams | Jan. 19, 1937 |

OTHER REFERENCES

Mellor, "A Comprehensive Treatise on Inorganic and Theoretical Chemistry," vol. 15, p. 374, Longmans, Green and Co., N. Y. publishers.

Mellor, "Modern Inorganic Chemistry," single vol. ed., p. 460 (Jan. 1935), Longmans, Green and Co., N. Y. publishers.